US010802005B2

(12) United States Patent
Mishima et al.

(10) Patent No.: US 10,802,005 B2
(45) Date of Patent: Oct. 13, 2020

(54) CHROMATOGRAM DATA PROCESSING SYSTEM

(71) Applicant: SHIMADZU CORPORATION, Kyoto-shi, Kyoto (JP)

(72) Inventors: Kenichi Mishima, Kameoka (JP); Etsuho Kamata, Kameoka (JP); Hiroshi Miura, Kyoto (JP); Yasuhiro Mito, Kyotanabe (JP); Toshinobu Yanagisawa, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 111 days.

(21) Appl. No.: 14/914,706

(22) PCT Filed: May 20, 2014

(86) PCT No.: PCT/JP2014/063364
§ 371 (c)(1),
(2) Date: Feb. 26, 2016

(87) PCT Pub. No.: WO2015/029508
PCT Pub. Date: Mar. 5, 2015

(65) Prior Publication Data
US 2016/0209380 A1    Jul. 21, 2016

(30) Foreign Application Priority Data

Sep. 2, 2013 (JP) .................................. 2013-181306

(51) Int. Cl.
*G01N 30/86* (2006.01)
*G01N 30/74* (2006.01)

(52) U.S. Cl.
CPC ......... *G01N 30/8624* (2013.01); *G01N 30/74* (2013.01); *G01N 30/861* (2013.01);
(Continued)

(58) Field of Classification Search
CPC ........... G01N 30/8624; G01N 30/8689; G01N 30/861; G01N 30/8675
See application file for complete search history.

(56) References Cited

U.S. PATENT DOCUMENTS 5,596,135 A     1/1997  Mito et al.
6,002,986 A *  12/1999  Mito ..................... G01N 30/82
                                                          702/23
(Continued)

FOREIGN PATENT DOCUMENTS

EP    0 486 030 A2   5/1992
JP    04-184166 A    7/1992
(Continued)

OTHER PUBLICATIONS

Van Zomeren et al., "Comparison of several curve resolution methods for drug impurity profiling using high-performance liquid chromatography with diode array detection", Analytica Chimica Acta, 487 (2003): pp. 155-170.*
(Continued)

*Primary Examiner* — Michele Fan
(74) *Attorney, Agent, or Firm* — Sughrue Mion, PLLC (57) ABSTRACT

A chromatogram data processing system having an impurity detector including a differential chromatogram creator, a purity curve creator and a determiner. The differential chromatogram creator calculates a differential coefficient of an absorbance spectrum with respect to wavelength at a local maximum or local minimum absorption wavelength of the target component, and creates a differential chromatogram which shows a temporal change of the differential coefficient. The purity curve creator creates a purity curve which shows a temporal change of the difference between the degree of similarity of a spectrum on the target peak to a reference spectrum and a threshold of the degree of similarity which is determined taking into account the influence
(Continued)

of noise components. The differential chromatogram and the purity curve are displayed on a display unit in a superposed form on a wavelength chromatogram created by a wavelength chromatogram creator.

2 Claims, 6 Drawing Sheets

(52) U.S. Cl.
CPC ..... *G01N 30/8675* (2013.01); *G01N 30/8689* (2013.01); *G01N 30/8651* (2013.01)

(56) References Cited

U.S. PATENT DOCUMENTS

| | | | |
|---|---|---|---|
| 2004/0014146 A1* | 1/2004 | Wang | G01N 30/8689 435/7.1 |
| 2013/0079379 A1* | 3/2013 | Shanler | A61K 31/4174 514/401 |
| 2014/0248643 A1* | 9/2014 | Muller-Spath | C07K 1/165 435/7.93 |

FOREIGN PATENT DOCUMENTS

| | | | | |
|---|---|---|---|---|
| JP | 07218491 | A * | 8/1995 | ......... G01N 30/8624 |
| JP | 2936700 | B2 | 8/1999 | |
| JP | 2000-266738 | A | 9/2000 | |
| JP | 2005-106537 | A | 4/2005 | |
| JP | 2011-185743 | A | 9/2011 | |
| WO | 2013/035639 | A1 | 3/2013 | |

OTHER PUBLICATIONS

Gorenstein et al., "Detecting Coeluted Impurites by Spectral Comparision", LC-GC, 12 (1994): pp. 768-772.*
Definition of "distinguishable", Google.com (2019) (Year: 2019).*
Yasuhiro Mito, et al., "Shimadzu Photodiode Array UV-VIS Detector SPD-M6A for HPLC", Shimadzu Review, 1989, pp. 21-28, vol. 46, No. 1.
International Search Report for PCT/JP2014/063364 dated Aug. 26, 2014 [PCT/ISA/210].
Communication dated Nov. 15, 2016 for corresponding Japanese Patent Application No. 2015-534023.
Written Opinion for PCT/JP2014/063364 dated Aug. 26, 2014. [PCT/ISA/237].
Shimadzu Corporation, "Shimadzu LCsolution Chromatography Data System Operation Manual", Shimadzu Corporation, 2004, total 22 pages.
Shimadzu, "LabSolutions", Data Acquisition & Processing Theory Guide, Shimadzu Corporation, Mar. 2012, 223-60090C, total 20 pages.
Communication dated Mar. 2, 2020 from the State Intellectual Property Office of the P.R.C. in Application No. 201810490733.6.

* cited by examiner

CHROMATOGRAM DATA PROCESSING SYSTEM

CROSS REFERENCE TO RELATED APPLICATIONS

This application is a National Stage of International Application No. PCT/JP2014/063364 filed May 20, 2014, claiming priority based on Japanese Patent Application No. 2013-181306 filed Sep. 2, 2013, the contents of all of which are incorporated herein by reference in their entirety.

TECHNICAL FIELD

The present invention relates to a data processing system for displaying the result of a determination on whether or not an impurity is contained in a peak of a chromatogram obtained by a spectral analysis of a sample which contains the components separated by using a column of a chromatograph, and particularly, a liquid chromatograph (LC), or a sample injected by a flown injection method.

BACKGROUND ART

Figures 9A, 9B:
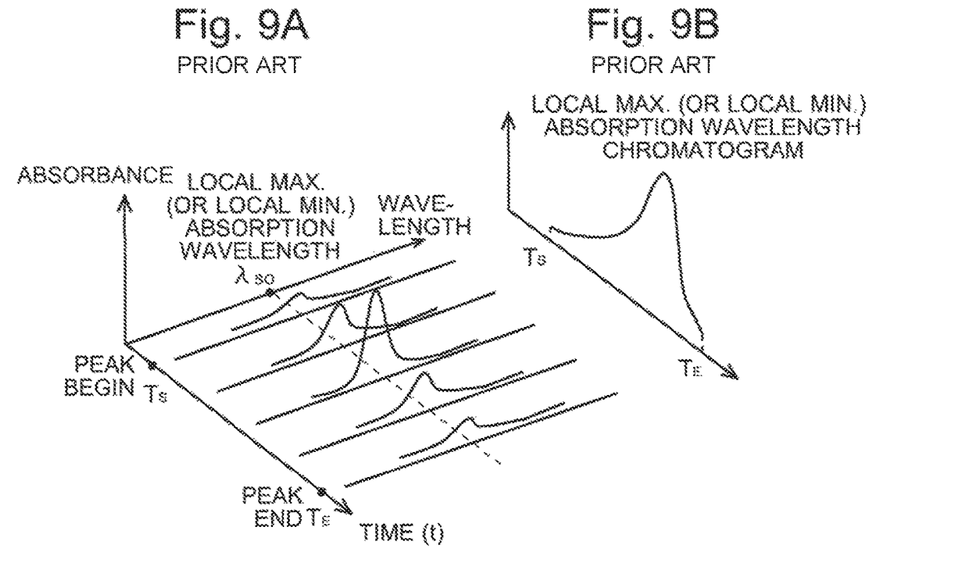
FIGS. 9A and 9B are model diagrams showing three-dimensional chromatogram data as well as a local maximum or local minimum absorption wavelength chromatogram created from the three-dimensional chromatogram data.

With a liquid chromatograph in which a multichannel detector, such as a photo diode array (PDA) detector, is used as the detector, three-dimensional chromatogram data having the three dimensions of time, wavelength and absorbance can be obtained by repeatedly acquiring an absorbance spectrum for an eluate from a column, with the point in time of the injection of the sample into the mobile phase as the base point. FIGS. 9A and 9B are model diagrams showing such a three-dimensional chromatogram. By extracting the time-absorbance data at a specific wavelength from the three-dimensional chromatogram data, a chromatogram at that specific wavelength ("wavelength chromatogram") can be created. Furthermore, by extracting the wavelength-absorbance data at a specific point in time from the three-dimensional chromatogram data, an absorbance spectrum at that point in time can be created.

When a quantitative analysis of a known kind of target component is performed using such a liquid chromatograph, the analysis is normally performed by obtaining a wavelength chromatogram at an absorption wavelength corresponding to that target component and calculating a quantitative value by comparing the area (or height) of a peak originating from the target component on the chromatogram with a calibration curve.

There is no problem with such a quantitative determination of a target component if the peak on the wavelength chromatogram originates from only that target component. However, a peak is not always composed of only a single component (target component); it is often the case that the peak additionally contains an impurity (i.e. any component other than the target component) unintended by the analysis operator. Accordingly, a peak purity determination process has conventionally been performed for a peak on the chromatogram to determine whether the peak has originated from only the target component or additionally contains an impurity.

For example, Patent Literatures 1 and 2 disclose techniques for determining the purity of a peak on a chromatogram obtained from three-dimensional chromatogram data having the three dimensions of time, wavelength and absorbance.

In the technique disclosed in Patent Literature 1, the degree of matching P of $S_0(\lambda)$ and $S(\lambda)$ is calculated by the following equation (1):

$$P = \frac{\sum S_0(\lambda) \cdot S(\lambda)}{\sqrt{\sum S_0^2(\lambda) \cdot \sum S^2(\lambda)}} \quad (1)$$

where $S_0(\lambda)$ is the absorbance spectrum at time $T_0$ corresponding to the peak top of the target peak on a wavelength chromatogram at an absorption wavelength corresponding to the target component, and $S(\lambda)$ is the absorbance spectrum at an arbitrary time T before or after $T_0$.

Figure 10A:
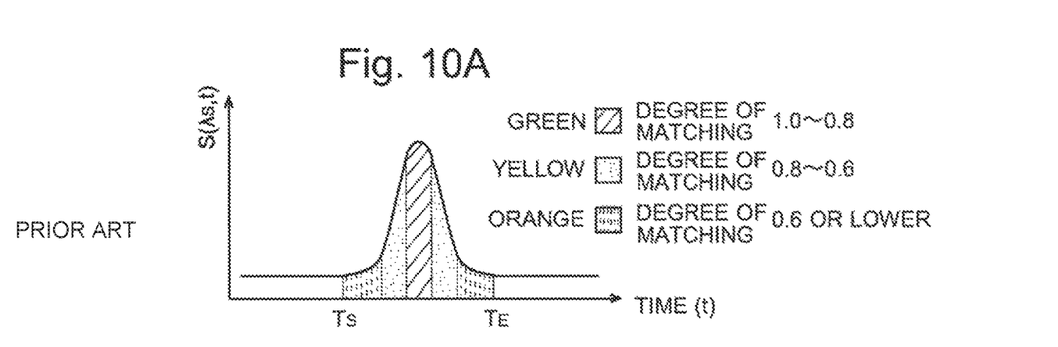
Figure 10B:
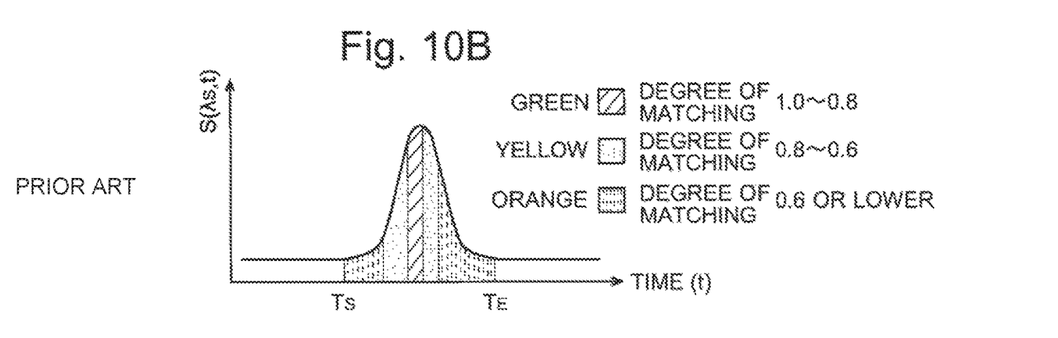
FIG. 10B is an example of the peak which contains an impurity.

Subsequently, as shown in FIGS. 10A and 10B, the target peak is divided into segments along the time axis and displayed, with each segment having a specific color corresponding to its degree of matching P with the peak top, e.g. green for a degree of matching P of 1.0-0.8, yellow for 0.8-0.6, and orange for 0.6 or lower (in the figures, those colors are represented by different shading patterns). If the target peak originates from only the target component, the degree of matching P is highest in the vicinity of the peak top and decreases with the distance from the peak top, as shown in FIG. 10A, so that the division pattern of the segments is roughly symmetrical with respect to the central axis of the peak. By contrast, if there is another peak before or after the peak top of the target peak (i.e. if the target peak contains an impurity), the degree of matching P of the time segment which includes that additional peak will be lowered, so that the degree of matching P will be different before or after the peak top of the target peak. For example, in the case of FIG. 10B, the degree of matching P on the right side (temporally later side) of the peak top is lower than on the left side, so that the division pattern of the segments is asymmetrical. Therefore, it is possible to conclude that an impurity is most likely to be contained within the time range near that point (this method is hereinafter called the "degree-of-matching determination method").

In the technique disclosed in Patent Literature 2, a wavelength chromatogram at an absorption wavelength corresponding to the target component is created from the three-dimensional chromatogram data. Additionally, at each point in time within the time range from the beginning point to the ending point of the target peak originating from the target component in that wavelength chromatogram, a differential coefficient of the absorbance spectrum at the local maximum or local minimum absorption wavelength of the absorbance spectrum of the target component is calculated. If the target peak contains only the target component, the differential coefficient will be zero, whereas the differential coefficient will have a non-zero value if an impurity is additionally contained in the target peak. Accordingly, in the disclosed technique, a chromatogram which shows the temporal change of the differential coefficient is created (this chromatogram is hereinafter called the "differential chromatogram"), and if a peak has appeared in its waveform (as indicated by the broken line in FIG. 11), it is determined that an impurity is contained (this method is hereinafter called the "differential spectrum method").

CITATION LIST

Patent Literature

Patent Literature 1: JP 2936700 B
Patent Literature 2: WO 2013/035639 A

Non Patent Literature

Non Patent Literature 1: Yasuhiro Mito and Mitsuo Kitaoka, "Shimadzu HPLC You Foto Daioodo Arei UV-VIS Kenshutsuki SPD-M6A (Shimadzu Photodiode Array UV-VIS Detector SPD-M6A for HPLC)", *Shimadzu Hyouron* (*Shimadzu Review*), Vol. 46, No. 1, pp. 21-28, 1989

SUMMARY OF INVENTION

Technical Problem

In the degree-of-matching determination method described in Patent Literature 1, the degree of matching P of the absorbance spectrum in the sections before and after the peak top is calculated with reference to the absorbance spectrum at time $T_0$ corresponding to the peak top of the target peak. Therefore, if an impurity peak exists in the vicinity to the peak top, it is impossible to correctly determine whether the impurity is present.

In the differential spectrum method described in Patent Literature 2, if the differential value of the absorbance spectrum of the impurity is zero at the wavelength where the differential value of the absorbance spectrum of the target component is zero, the impurity cannot be detected since the peak of the impurity will not appear on the differential chromatogram.

As described thus far, the previously proposed methods for determining whether or not an impurity is contained in a target peak may possibly fail to correctly detect the presence of an impurity depending on the relationship between the absorption wavelength of the target component and that of the impurity.

The description thus far has assumed the case where one component is the target component while the other is an impurity. However, the previous discussion is also applicable in the case of analyzing a chromatogram of a sample containing two or more target components to determine whether the target peak is composed of a single component or a plurality of components.

The present invention has been developed to solve the previously described problem. Its objective is to provide a chromatogram data processing system capable of easily determining whether or not an impurity is contained in a target peak originating from a target component.

Solution to Problem

The chromatogram data processing system according to the present invention developed for solving the previously described problem includes:

a) a three-dimensional data storage section for storing three-dimensional chromatogram data with time, wavelength and absorbance as dimensions;

b) a wavelength chromatogram creator for extracting, from the three-dimensional chromatogram data, a set of data obtained at a specific wavelength which is an absorption wavelength of a target component and for creating a wavelength chromatogram showing a relationship between the time and the absorbance at the specific wavelength;

c) a peak detector for detecting a peak of the created wavelength chromatogram;

d) an impurity detector for detecting the presence or absence of an impurity in the detected peak by two or more detection methods based on the three-dimensional chromatogram data; and e) a display unit for displaying graphs for impurity detection obtained by the two or more detection methods in a superposed form on the wavelength chromatogram.

The "two or more detection methods" include the case where those methods are identical in detection principle but different from each other in the used parameters. Specifically, for example, using a plurality of wavelengths (differential wavelengths) in the differential spectrum method is regarded as the use of different detection methods, as will be described later.

By the chromatogram data processing system according to the present invention, the presence or absence of an impurity in a peak at a specific wavelength (which is an absorption wavelength) is detected by analyzing the stored three-dimensional chromatogram data by two or more detection methods. The two or more graphs for impurity detection created as a result of the data analysis are displayed in a superposed form on the chromatogram at the specific wavelength. All of these two or more graphs may be simultaneously superposed on the specific wavelength chromatogram, or an arbitrary combination of two or more graphs may be superposed on it according to a designation by an operator.

Preferably, the chromatogram data processing system according to the present invention should further include:

f) an input section for selecting the two or more detection methods to be used by the impurity detector, or for inputting a parameter to be set in the two or more detection methods (which is hereinafter called the "setting parameter").

The two or more methods should preferably be selected from the group consisting of a degree-of-matching determination method, a differential spectrum method and a purity determination method. As already explained, the degree-of-matching determination method is a method in which the degree of matching between an absorbance spectrum at time $T_0$ corresponding to the peak top of the target peak on the wavelength chromatogram and an absorbance spectrum at an arbitrary time T before or after $T_0$ is calculated. The differential spectrum method is a method in which a differential coefficient of the absorbance spectrum with respect to wavelength at the local maximum or local minimum absorption wavelength of the target component is determined, and if a peak is located in the waveform of a differential chromatogram which shows the temporal change of the differential coefficient, it is determined that an impurity is contained. The purity determination method, the details of which will be detailed later, is a method in which the presence or absence of an impurity is determined by comparing the degree of similarity between a spectrum on the target peak and a reference spectrum, with a threshold of the degree of similarity which is determined taking into account the influence of noise components.

Examples of the setting parameter include: the specific wavelength, which is one of the absorption wavelengths of the target component specified for the creation of the wavelength chromatogram; and the local maximum or local minimum absorption wavelength of the target component which is necessary in the differential spectrum method.

Advantageous Effects of the Invention

By the chromatogram data processing system according to the present invention, the presence or absence of an impurity is detected by two or more detection methods. The thereby obtained two or more graphs for detecting the presence or absence of an impurity are displayed on the display unit in a superposed form on the wavelength chromatogram at the specific wavelength which is an absorption wavelength of the target component. Even when the presence of an impurity cannot be detected by one detection method, the presence of the impurity may possibly be recognized by another detection method. Therefore, whether or not an impurity is present in the target chromatogram peak can be more assuredly determined.

BRIEF DESCRIPTION OF DRAWINGS

FIGS. 10A and 10B show display examples of the result obtained by the degree-of-matching determination method, where FIG. 10A is an example of the peak which contains no impurity while

DESCRIPTION OF EMBODIMENTS

Embodiments of the chromatogram data processing system according to the present invention are described with reference to the drawings. Initially, the method for determining the peak purity used in the present embodiments is hereinafter described.

Method for Determining Peak Purity

In the present embodiments, the degree-of-matching determination method, differential spectrum method, and purity determination methods are used. The degree-of-matching determination method and differential spectrum method have already been described in the "BACKGROUND ART" section. Accordingly, in this section, the principle of the determination on the presence or absence of an impurity by the purity determination method is briefly described. Descriptions of the purity determination method are commonly available, e.g. in Non-Patent Literature 1.

In the purity determination method, the degree of similarity (SI) between a spectrum in a chromatogram peak (measured spectrum) and the reference spectrum is calculated, and the obtained value is compared with a threshold (t) of the degree of similarity which is determined taking into account the influence of noise components. If the degree of similarity (SI) between the measured spectrum and the reference spectrum is equal to or higher than the threshold (t), it is concluded that the two components are most likely to have originated from the same component. Conversely, if the degree of similarity (SI) between them is lower than the threshold (t), it is concluded that an impurity is present in the chromatogram peak in question.

The degree of similarity SI of two spectra is calculated as follows: A single spectrum can be considered to be an array of intensity values respectively obtained at different wavelengths and therefore can be expressed by a vector with the intensity values at the respective wavelengths as its elements. More specifically, letting $a(\lambda i)$ denote the intensity at wavelength $\lambda i$, the vectors S1 and S2 of the two spectra can be expressed as follows:

$$S1=(a1(\lambda 1), a1(\lambda 2), \ldots, a1(\lambda n))$$

$$S2=(a2(\lambda 1), a2(\lambda 2), \ldots, a2(\lambda n))$$

It is possible to consider that the closer these two vectors S1 and S2 are (i.e. the smaller the angle between the two vectors is), the higher the degree of similarity of the two spectra is. Therefore, the value of the cosine of angle θ formed by the two vectors S1 and S2 (cos θ) can be used as an index of the degree of similarity of the two spectra. If the two spectra are completely identical in shape, the angle θ between those vectors S1 and S2 is zero and cos θ=1. Actually, this does not occur: For example, in the case of an absorbance spectrum, the angle θ formed by the two vectors becomes greater than zero due to some uncertainty factors, such as the background noise inherent in the detector or the noise components associated with the absorption by the mobile phase. Accordingly, with $\theta_{th}$ denoting the largest possible value of the angle formed by the two vectors due to uncertain noise factors, if the angle θ formed by the two vectors S1 and S2 is smaller than $\theta_{th}$, it is possible to conclude that the discrepancy is due to some noise or similar factors and determine that the two vectors originate from the same absorbance spectra (i.e. the same component). If the angle θ formed by the two vectors S1 and S2 is greater than $\theta_{th}$, i.e. if cos θ is smaller than cos $\theta_{th}$, it is possible to determine that an impurity is contained. That is to say, cos $\theta_{th}$ corresponds to the threshold (t). The value obtained by subtracting this threshold t from the degree of similarity SI is hereinafter called the "purity index."

Figure 4:
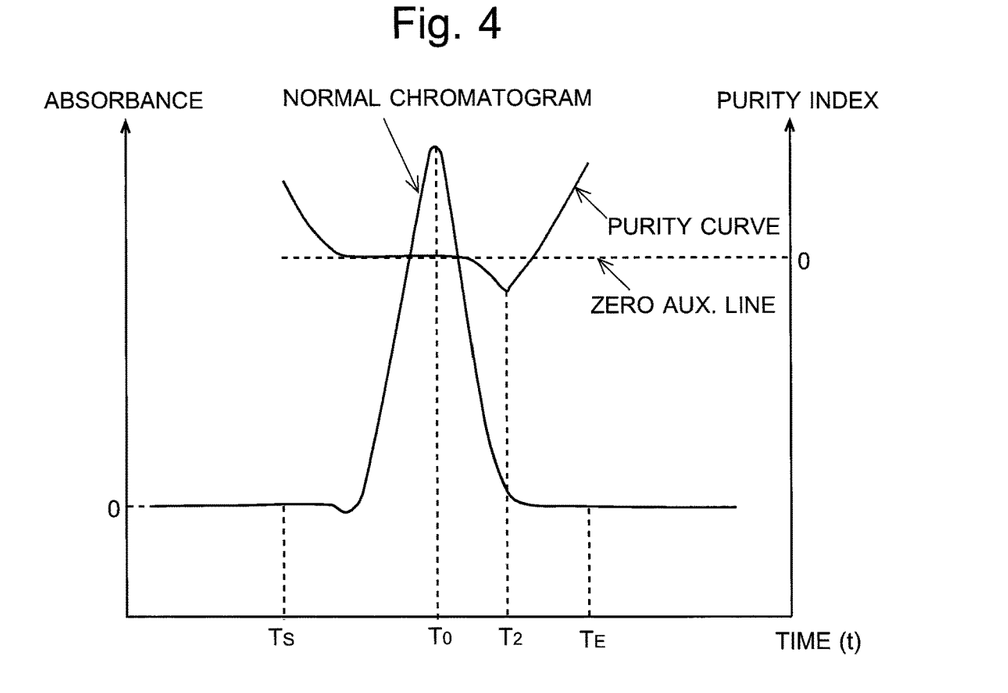
FIG. 4 shows one example of a graph for detecting the presence or absence of an impurity (purity curve) in the purity determination method.

FIG. 4 illustrates a purity curve which shows the purity index (=SI−t) on the vertical axis plotted against the retention time of the peak on the horizontal axis. The "normal chromatogram" in FIG. 4 is the wavelength chromatogram at a specific wavelength which is an absorption wavelength of the target component. In FIG. 4, the purity curve has a section at time $T_2$ within which the curve is lower than the "zero auxiliary line" on which the purity index is zero. Within this section, the purity index (=SI−t) is lower than zero, and the degree of similarity is lower than the threshold. Therefore, it can be determined that an impurity is present within this section.

Thus, with the purity determination method, whether or not an impurity is contained in the target peak can be determined from the purity curve.

First Embodiment

Figure 1:
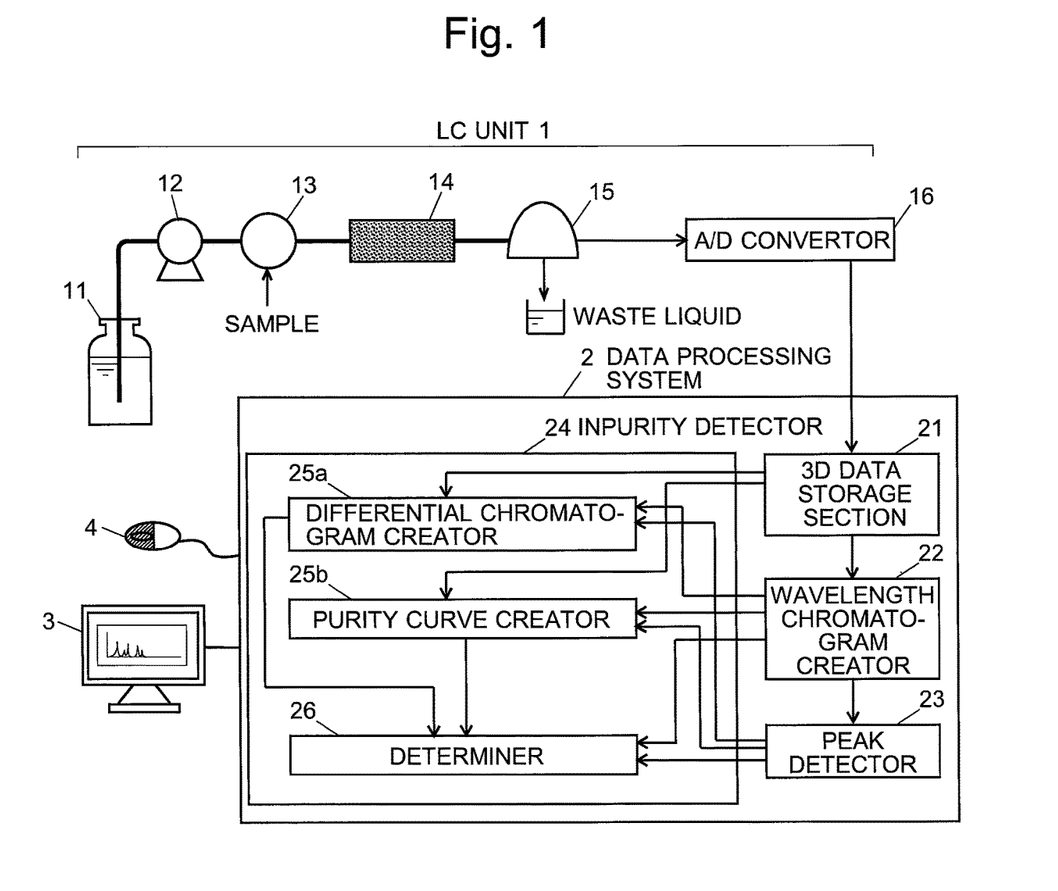
FIG. 1 is a schematic configuration diagram of a liquid chromatograph having a chromatogram data processing system of the first embodiment of the present invention.

The first embodiment of the chromatogram data processing system according to the present invention is described with reference to FIG. 1. FIG. 1 is a schematic configuration diagram of a liquid chromatograph system having the chromatogram data processing system of the present embodiment (which is hereinafter simply called the "data processing system").

In an LC unit 1 for collecting three-dimensional chromatogram data, a liquid-sending pump 12 draws a mobile phase from a mobile-phase container 11 and supplies it to a sample injector 13 at a fixed flow rate. The sample injector 13 injects the sample into the mobile phase at a predetermined timing. The sample is carried by the mobile phase into a column 14. While passing through the column 14, the components in the sample are temporally separated and individually eluted from the column 14.

At the exit port of the column 14, a PDA detector 15, which is a type of multichannel detector, is provided as the detector for detecting the sample components in the eluate from the column 14. In the PDA detector 15, a ray of light from a light source (not shown) is cast into the eluate. The light which has passed through the eluate is dispersed into component wavelengths, and the intensities of those wavelengths of light are almost simultaneously detected with a PDA linear sensor. The detection signals repeatedly acquired by the PDA detector 15 are converted into digital signals by an A/D converter 16 and sent to the data processing system 2 as three-dimensional chromatogram data.

The data processing unit 2 includes: a three-dimensional data storage section 21 for storing the three-dimensional chromatogram data produced by the A/D convertor 16; a wavelength chromatogram creator 22 for creating, from the three-dimensional chromatogram data; a wavelength chromatogram which shows the temporal change of the absorbance at a predetermined wavelength; and a peak detector 23 for detecting a peak in the wavelength chromatogram; and an impurity detector 24 for detecting an impurity in a target peak designated by an operator among the detected peaks. In the present embodiment, the wavelength chromatogram creator 22 creates a local maximum or local minimum absorption wavelength chromatogram which shows the temporal change of the absorbance at a local maximum or local minimum absorption wavelength $\lambda_{SO}$ of the target component.

The impurity detector 24 includes a differential chromatogram creator 25a and a purity curve creator 25b, each of which processes the three-dimensional chromatogram data to create a graph for impurity detection. The differential chromatogram creator 25a creates a differential chromatogram based on the three-dimensional chromatogram data as well as the local maximum or local minimum absorption wavelength $\lambda_{SO}$ of the target component. The purity curve creator 25b creates a purity curve from the degree of similarity between a spectrum on the target peak and a reference spectrum as well as the degree of similarity in the case where only the noise components are taken into account, based on the three-dimensional chromatogram data as well as the local maximum or local minimum absorption wavelength $\lambda_{SO}$ so of the target component. The impurity detector 24 further includes a determiner 26 for determining the presence or absence of an impurity in the target peak based on the shape of the differential chromatogram or that of the purity curve. The operations of those components will be described later.

The display unit 3 is used to display various kinds of information, such as the wavelength chromatogram at the local maximum or local minimum absorption wavelength $\lambda_{SO}$ of the target component, the absorbance spectrum, the differential chromatogram, the purity curve, and the results of determination. The operation unit 4 is controlled by an operator to enter and set various items of information necessary for the data analysis, such as the selection of the method for determining the presence or absence of an impurity, the local maximum or local minimum absorption wavelength $\lambda_{SO}$ of the target component, as well as the local maximum or local minimum absorption wavelength necessary for the differential spectrum method.

A portion or the entirety of the functions of the data processing system 2 can be realized by running a dedicated controlling and processing software program installed on a personal computer or workstation. The display unit 3 is a commonly used liquid crystal display or similar device. The operation unit 4 may include a keyboard, pointing device (e.g. mouse) and other devices which are standard equipment of personal computers or workstations.

Figure 2:
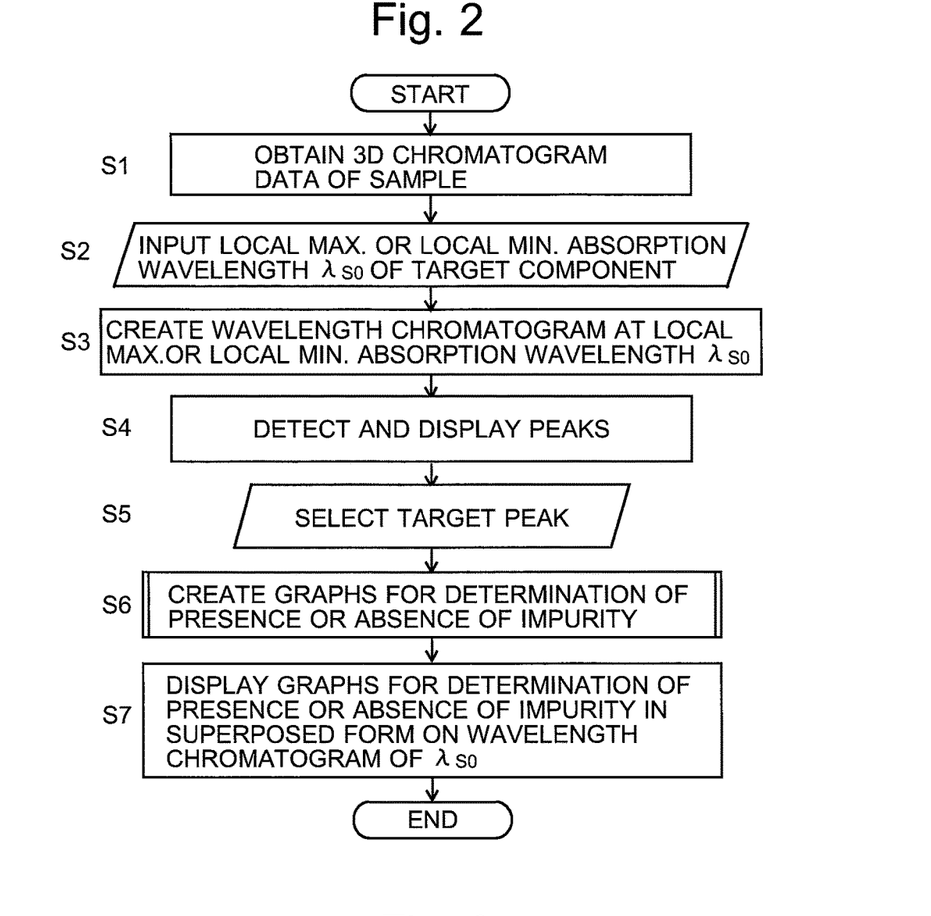
FIG. 2 is a flowchart showing the operation of a peak purity determination process in the chromatogram data processing system of the same embodiment.
Figure 3:
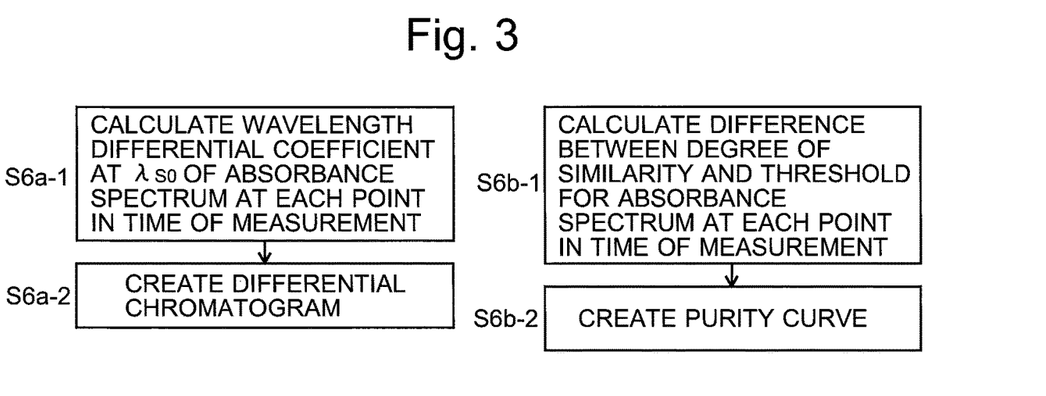
FIG. 3 is a flowchart showing the operation of creating graphs for impurity detection in the chromatogram data processing system of the same embodiment.

A data processing operation characteristic of the liquid chromatograph system of the first embodiment is hereinafter described with reference to the flowcharts of FIGS. 2 and 3.

Initially, a chromatographic analysis for a target sample is performed in the LC unit 1. Three-dimensional chromatogram data (see FIG. 9A) showing the temporal change of the absorbance spectrum within a predetermined wavelength range are sent from the PDA detector 15 to the three-dimensional data storage section 21 and stored in the same data storage section 21 (Step S1).

Subsequently, the operator enters, from the operation unit 4, the wavelength value of the local maximum or local minimum absorption wavelength $\lambda_{SO}$ of the target component contained in the sample (Step S2). In response to this operation, the wavelength chromatogram creator 22 creates a local maximum or local minimum absorption wavelength chromatogram showing the absorbance at the local maximum or local minimum absorption wavelength $\lambda_{SO}$ on the vertical axis plotted against the time on the horizontal axis based on the entered local maximum or local minimum absorption wavelength $\lambda_{SO}$ as well as the three-dimensional chromatogram data stored in the three-dimensional data storage section 21, and displays the created chromatogram on the display unit 3 (Step S3). FIG. 9B shows one example of the local maximum absorption wavelength chromatogram created based on the three-dimensional chromatogram data shown in FIG. 9A.

The peak detector 23 sequentially examines, along the time axis, the amount of inclination of the curve of the local maximum or local minimum absorption wavelength chromatogram created by the wavelength chromatogram creator 22. In this examining process, the point when the amount of inclination first exceeds a predetermined value is identified as the beginning point $T_S$ of a peak, the point when the amount of inclination changes from a positive value through zero to a negative value is identified as the peak top $T_O$, and the point when the absolute value of the amount of inclination becomes lower than a predetermined value is identified as the ending point $T_E$ of the peak. Thus, one peak is detected (Step S4). If the sample contains a plurality of components, a plurality of peaks are normally detected. Information on the detected peaks is shown on the screen of the display unit 3. The operator using the operation unit 4 selects, from those peaks, the target peak which originates from the target component (Step S5).

Figure 11:
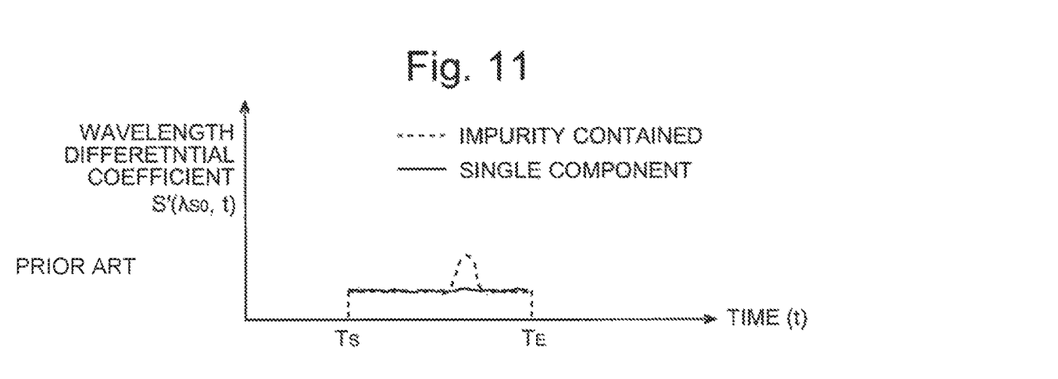
FIG. 11 shows one example of the differential chromatogram which is a result obtained by the differential spectrum method.

After the target peak is selected, the differential chromatogram creator 25a and the purity curve creator 25b sequentially create graphs which show whether or not an impurity is contained in the target peak (Step S6). The data processing operation performed in each of these functional blocks 25a and 25b is as follows:

The differential chromatogram creator 25a obtains, from the three-dimensional data storage section 21, the absorbance spectra included in the time range from the beginning point $T_S$ to the ending point $T_E$ of the target peak, and calculates the wavelength differential coefficient for each of those absorbance spectra by differentiating the absorbance at the local maximum or local minimum absorption wavelength $\lambda_{S0}$ with respect to wavelength (Step S6a-1). Subsequently, it creates a differential chromatogram showing the calculated wavelength differential coefficient on the vertical axis plotted against the time on the horizontal axis (Step S6a-2). FIG. 11 shows one example of the differential chromatogram.

The purity curve creator 25b obtains, from the three-dimensional data storage section 21, the absorbance spectra included in the time range from the beginning point $T_S$ to the ending point $T_E$ of the target peak, and calculates the purity index, i.e. the difference between the degree of similarity and the threshold, for each of those absorbance spectra (Step S6b-1). Subsequently, it creates a purity curve showing the calculated purity index on the vertical axis plotted against the time on the horizontal axis (Step S6b-2).

The graphs for determining the presence or absence of an impurity in each determination method obtained in the previously described manner (the differential chromatogram and purity curve) are displayed on the display unit 3 in a superposed form on the wavelength chromatogram displayed in Step S3 (Step S7).

Figure 5:
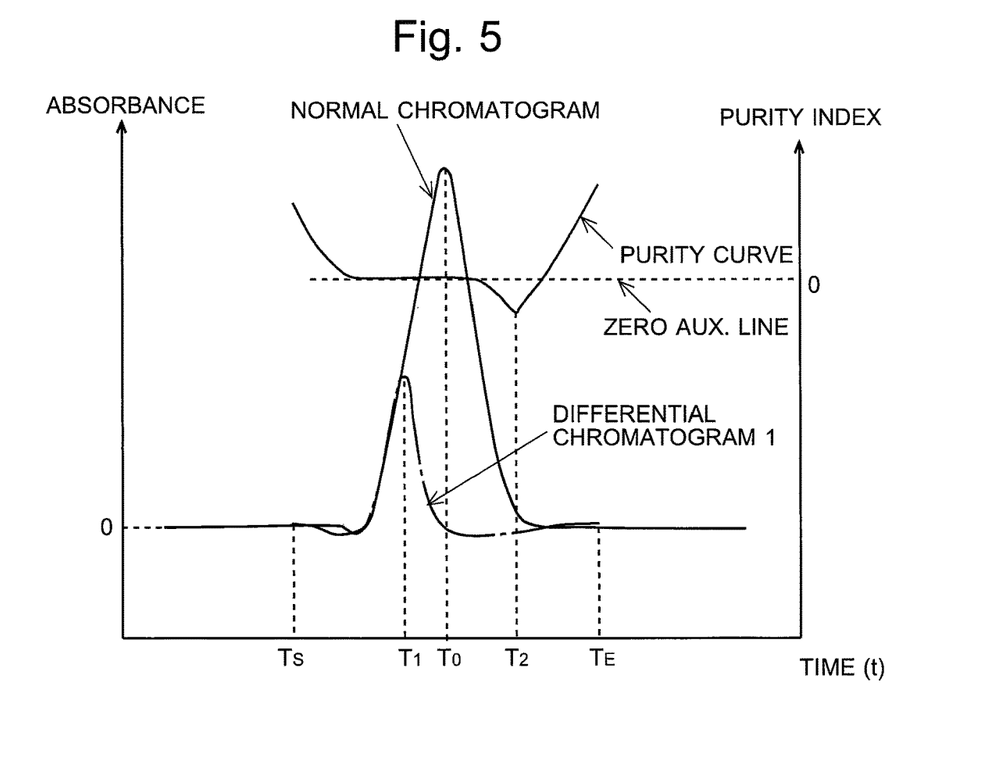
FIG. 5 shows one example of the display on the display unit after the completion of the process by the chromatogram data processing system of the first embodiment.

FIG. 5 is one example of the display on the display unit after the completion of the process by the chromatogram data processing system of the present embodiment. The "normal chromatogram" is the wavelength chromatogram at the local maximum or local minimum absorption wavelength $\lambda_{S0}$ of the target component. In the data processing system 2 of the first embodiment, the differential chromatogram created on the basis of the differential spectrum method and the purity index created on the basis of the purity determination method are superposed on the normal chromatogram. This normal chromatogram actually has impurity peaks at times $T_1$ and $T_2$ along with the peak of the target component of the sample at time $T_0$, although those impurity peaks are invisible in the wavelength chromatogram. In FIG. 5, the presence of the impurity at time $T_1$ is discernible on the differential chromatogram, while it is indiscernible on the purity curve. Conversely, the presence of the impurity at time $T_2$ is not discernible on the differential chromatogram but is discernible on the purity curve. Consider the case where either the differential spectrum method or the purity method is solely used for the impurity determination. The differential spectrum method only reveals the presence of the impurity at time $T_1$ and the presence of the impurity at time $T_2$ is unrecognized, whereas the purity determination method only reveals the presence of the impurity at time $T_2$ and the presence of the impurity at time $T_1$ is unrecognized. By contrast, in the case of the data processing system 2 according to the present embodiment, both impurities which cannot be simultaneously detected by only one of those impurity determination methods are detected: the presence of the impurity at time $T_1$ is revealed by the differential spectrum method, and the presence of the impurity at time $T_2$ is also revealed by the purity determination method. Thus, whether or not an impurity is present can be more assuredly determined.

Second Embodiment

In the first embodiment, the differential chromatogram creator 25a and the purity curve creator 25b created the differential chromatogram and the purity curve, respectively (Step S6). As one modified example, if it is previously known that the absorbance spectrum of the target component has a plurality of maxima or minima, the differential chromatogram creator 25a may be configured so as to create and display a differential chromatogram at each of the other local maximum or local minimum absorption wavelengths (e.g. $\lambda_2$ and $\lambda_3$) of the target component in addition to the first local maximum or local minimum absorption wavelength $\lambda_{S0}$.

Figure 6:
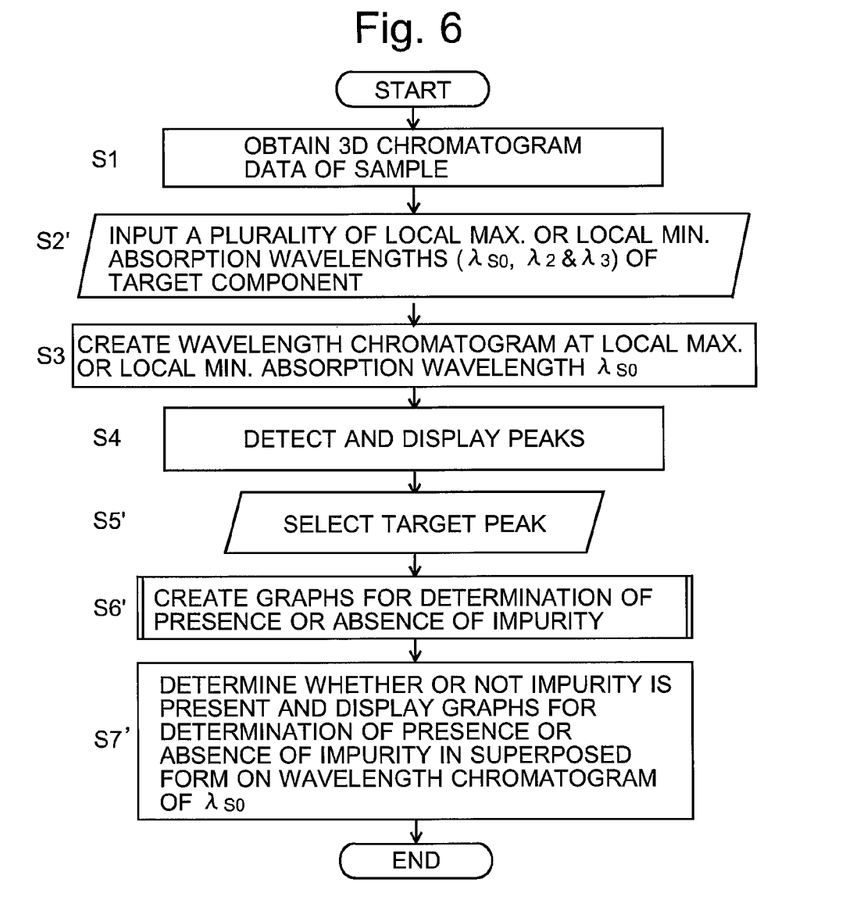
FIG. 6 is a flowchart showing the operation of a peak purity determination process in the chromatogram data processing system of the second embodiment.
Figure 7:
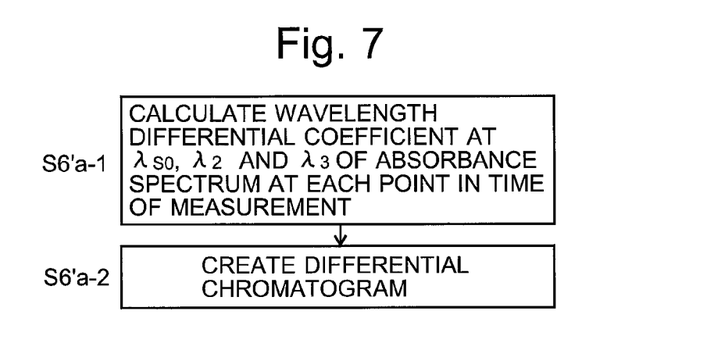
FIG. 7 is a flowchart showing the operation of creating graphs for impurity detection in the chromatogram data processing system of the same embodiment.

FIGS. 6 and 7 are flowcharts showing the operation of the peak purity determination process in the chromatogram data processing system of the second embodiment. With reference to FIGS. 6 and 7, the differences of the data processing operation according to the second embodiment from the first embodiment will be hereinafter described.

In the present embodiment, the previously described Step S2 is modified: the operator using the operation unit 4 inputs a plurality of wavelength values of the local maximum or local minimum absorption wavelength of the target component contained in the sample (Step S2'). Among those wavelengths, the operator designates one wavelength as the absorption wavelength $\lambda_{S0}$ of the target component to be used for the creation of the wavelength chromatogram.

The previously described Step S5 is also modified: the selection of the target peak originating from the target component is performed for each of the selected peak absorption wavelengths $\lambda_{S0}$, $\lambda_2$ and $\lambda_3$ (Step S5').

Furthermore, the previously described Step S6 is modified so that the differential chromatogram creator 25a creates a graph showing whether or not an impurity is contained (differential chromatogram) for each of the target peaks at the peak absorption wavelengths $\lambda_{S0}$, $\lambda_2$ and $\lambda_3$ (Step S6'). In other words, for each of the wavelength chromatograms at those wavelengths $\lambda_{S0}$, $\lambda_2$ and $\lambda_3$, the differential chromatogram creator 25a sequentially obtains, from the three-dimensional data storage section 21, the absorbance spectra included in the time range from the beginning point $T_S$ to the ending point $T_E$ of the peak, and calculates the wavelength differential coefficient for each of those absorbance spectra by differentiating the absorbance at the local maximum or local minimum absorption wavelength $\lambda_{S0}$, $\lambda_2$ or $\lambda_3$ with respect to wavelength (Step S6'a-1). Subsequently, it creates differential chromatograms 1, 2 and 3 each of which shows the calculated wavelength differential coefficient on the vertical axis plotted against the time on the horizontal axis (Step S6'a-2).

Additionally, in the present embodiment, the determiner 26 determines the presence or absence of an impurity based on the graphs created for the impurity detection, and displays the result on the display unit 3 (Step S7'). Specifically, the determiner 26 examines whether or not each of the differential chromatograms created in the present embodiment is flat within the time range from the beginning point $T_S$ to the ending point $T_E$ of the target peak. If the differential chromatogram is flat, the determiner 26 concludes that the target peak contains no impurity. Conversely, if the differential chromatogram is not flat, the determiner 26 concludes that the target peak contains an impurity. Whether or not the differential chromatogram is flat can be determined, for example, by determining whether or not there is a peak having an intensity higher than N times the intensity of the baseline noise or a peak having a peak area larger than a predetermined value. Other methods may also be adopted.

In the case where the graph created for impurity detection is a purity curve, the determiner 26 examines whether or not the purity curve falls below the zero auxiliary line within the time range from the beginning point $T_S$ to the ending point $T_E$ of the target peak. If the curve does not fall below that line, the determiner 26 concludes that the target peak does not contain any impurity. If the curve falls below that line, it concludes that the target peak contains an impurity.

If it has been determined by any one of the detection methods that an impurity is contained, the determiner 26 eventually concludes that an impurity is contained, and displays the message of "Impurity: Found" on the display unit 3. If all of the detection methods have led to the conclusion that no impurity is contained, the determiner 26 eventually concludes that no impurity is contained, and displays the message of "Impurity: Not Found" on the display unit 3.

The other steps are the same as in the first embodiment.

Figure 8:
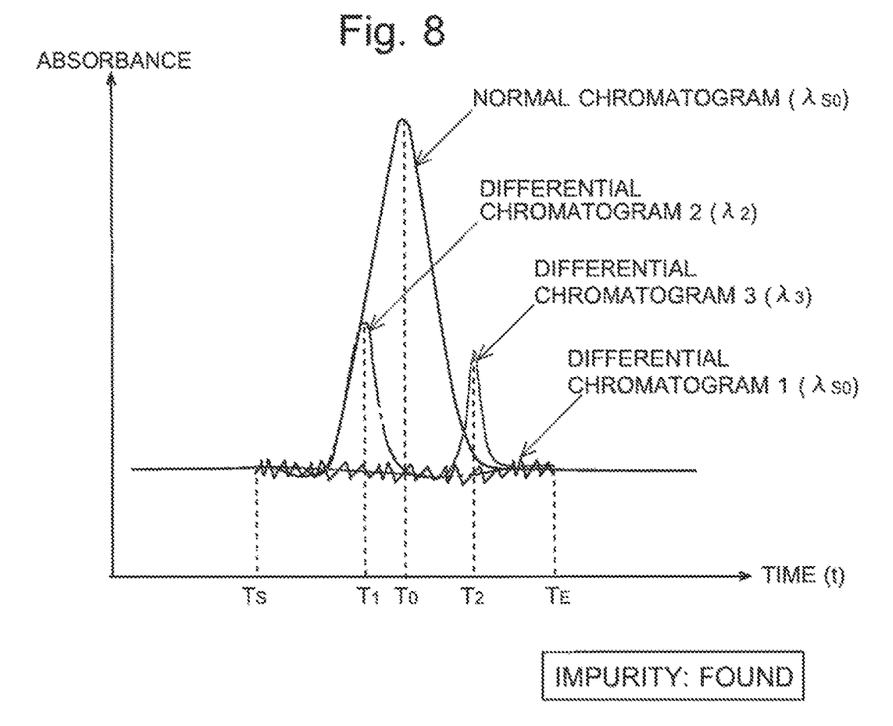
FIG. 8 shows one example of the display on the display unit after the completion of the process by the chromatogram data processing system of the same embodiment.

FIG. 8 is one example of the display on the display unit after the completion of the process by the chromatogram data processing system of the present embodiment. In FIG. 8, the wavelength chromatogram at wavelength $\lambda_{S0}$ of the target peak (which is referred to as the "normal chromatogram" in FIG. 8) has the peak of the target component of the sample at time $T_0$ as well as the peaks of impurities A and B at $T_1$ and $T_2$. In the present example, it is assumed that these impurity peaks are invisible on this wavelength chromatogram. It is also assumed that both impurities A and B have a differential value of zero at $\lambda_{S0}$ in the spectra of the impurities. Additionally, it is assumed that each one of the impurities A and B has a differential value of zero at $\lambda_3$ or $\lambda_2$ in the spectrum of the impurity, respectively.

In the differential chromatogram 1 at the peak wavelength $\lambda_{S0}$ of the target component, since the differential value of the spectrum of each impurity is zero, the peaks of the impurities are obscured by noise, so that neither the presence of the impurity at time $T_1$ nor that of the impurity at time $T_2$ is detected. In the differential chromatogram 2 at wavelength $\lambda_2$, the presence of impurity A at time $T_1$ is detected, while the presence of impurity B at time $T_2$ is not detected. In the differential chromatogram 3 at the local minimum absorption wavelength $\lambda_3$ of the target component, the presence of impurity B at time $T_2$ is detected, while the presence of impurity A at time $T_1$ is not detected.

As just described, if the spectrum of an impurity contained in the sample has a differential value of zero at the peak wavelength $\lambda_{S0}$ of the target component, the differential chromatogram at $\lambda_{S0}$ corresponding to the target peak remains at zero and the impurity cannot be detected on this chromatogram. However, it is practically unthinkable that the differential values of the spectrum of that impurity at other local maximum or local minimum absorption wavelengths $\lambda_2$ and $\lambda_3$ of the target component are also zero. Accordingly, by displaying a plurality of differential chromatograms at a plurality of local maximum or local minimum absorption wavelengths of the target component, whether or not an impurity is present can be more assuredly determined.

The present invention is not limited to the first and second embodiments, but can be subjected to appropriate changes, additions or modifications within the spirit of the present invention.

For example, in the case of using the differential spectrum method, a spectrum of the target component may be displayed on the screen so that the operator can appropriately select the local maximum or local minimum absorption wavelength to be used as the differential wavelength. By such a configuration, the experience of the operator can be reflected in the determination for the impurity detection. It is also possible to additionally display other impurity determination methods (such as the purity determination method) on the screen display and allow the operator to appropriately select one of them.

In the previous embodiment, the wavelength at which the wavelength chromatogram to be eventually displayed on the display unit (the "normal chromatogram" in FIGS. 5 and 8) is obtained is the local maximum or local minimum absorption wavelength $\lambda_{S0}$ of the target component. The wavelength does not need to strictly coincide with the local maximum or local minimum absorption wavelength but may be any wavelength within the target peak of the target component.

REFERENCE SIGNS LIST

1 . . . LC Unit
11 . . . Mobile-Phase Container
12 . . . Liquid-Sending Pump
13 . . . Sample Injector
14 . . . Column
15 . . . PDA Detector
16 . . . A/D Converter
2 . . . Data Processing System
21 . . . Three-Dimensional Data Storage Section
22 . . . Wavelength Chromatogram Creator
23 . . . Peak Detector
24 . . . Impurity Detector
25a . . . Differential Chromatogram Creator
25b . . . Purity Curve Creator
26 . . . Determiner
3 . . . Display Unit
4 . . . Operation Unit

The invention claimed is:

1. A chromatogram data processing system, comprising:
a) a three-dimensional data storage section for storing three-dimensional chromatogram data with time, wavelength and absorbance as dimensions;
b) a wavelength chromatogram creator for extracting, from the three-dimensional chromatogram data, a set of data obtained at a specific wavelength which is an absorption wavelength of a target component and for creating a wavelength chromatogram showing a relationship between the time and the absorbance at the specific wavelength;
c) a peak detector for detecting a peak of the created wavelength chromatogram;
d) a processor configured to create graphs showing a presence or absence of at least one impurity in the detected peak by performing two or more detection methods on the three-dimensional chromatogram data sequentially in one analyzing process, wherein the two or more detection methods are designed to enable to detect different impurity, respectively, and are applied to a same peak of the three-dimensional chromatogram data; and e) a display unit for displaying the graphs that are different from each other obtained by the two or more detection methods in a superposed form on the wavelength chromatogram to determine a presence or absence of the at least one impurity in the detected peak, wherein the two or more methods are selected from a group consisting of a degree-of-matching determination method in which a degree of matching between an absorbance spectrum at time $T_0$ corresponding to a peak top of a target peak on the wavelength chromatogram and an absorbance spectrum at an arbitrary time T before or after $T_0$ is calculated, a differential spectrum method in which a differential coefficient of an absorbance spectrum with respect to wavelength at a local maximum or local minimum absorption wavelength of the target component is determined, and if a peak is located in a waveform of a differential chromatogram which shows a temporal change of the differential coefficient, it is determined that an impurity is contained, and a purity determination method in which the presence or absence of an impurity is determined by comparing a degree of similarity between a spectrum on a target peak and a reference spectrum, with a degree of similarity of these two spectra which is determined taking into account an influence of noise components.

2. The chromatogram data processing system according to claim 1, further comprising:

f) an input section for selecting the two or more detection methods to be used by the impurity detector, or for inputting a parameter to be set in the two or more detection methods.

* * * * *